US011797948B2

(12) United States Patent
Schemers et al.

(10) Patent No.: US 11,797,948 B2
(45) Date of Patent: *Oct. 24, 2023

(54) METHOD, APPARATUS AND COMPUTER PROGRAM PRODUCT FOR IMPROVING EVENT CREATION AND MODIFICATION IN A GROUP-BASED COMMUNICATION PLATFORM

(71) Applicant: Slack Technologies, LLC, San Francisco, CA (US)

(72) Inventors: Roland Schemers, Woodside, CA (US); James McPhail, San Francisco, CA (US); Lydia Han, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/955,127

(22) Filed: Sep. 28, 2022

(65) Prior Publication Data
US 2023/0030552 A1    Feb. 2, 2023

Related U.S. Application Data

(63) Continuation of application No. 16/263,969, filed on Jan. 31, 2019, now Pat. No. 11,494,741.

(51) Int. Cl.
| G06Q 10/06 | (2023.01) |
| G06Q 10/10 | (2023.01) |
| G06Q 10/1093 | (2023.01) |
| H04L 51/08 | (2022.01) |

(52) U.S. Cl.
CPC ......... *G06Q 10/1093* (2013.01); *H04L 51/08* (2013.01)

(58) Field of Classification Search
CPC .............................. G06Q 10/06; G06Q 10/10
USPC ........................................................ 705/7.18
See application file for complete search history.

(56) References Cited

U.S. PATENT DOCUMENTS

| 11,494,741 | B1* | 11/2022 | Schemers | G06Q 10/1093 |
| 2009/0030919 | A1* | 1/2009 | Brezina | H04L 51/046 |
| 2010/0293029 | A1* | 11/2010 | Olliphant | G06Q 10/1095 705/7.19 |
| 2011/0137700 | A1* | 6/2011 | Hamalainen | G06Q 10/1093 705/7.18 |
| 2011/0252351 | A1* | 10/2011 | Sikora | G06Q 10/109 715/764 |
| 2012/0084286 | A1* | 4/2012 | Hubner | G06Q 10/1093 707/E17.089 |
| 2014/0047023 | A1* | 2/2014 | Baldwin | H04L 67/535 709/204 |
| 2014/0089418 | A1* | 3/2014 | Davenport | H04L 51/216 709/206 |

(Continued)

OTHER PUBLICATIONS

"Die, Email, Die! A Flickr Cofounder Aims to Cut Us All Some Slack", ReadWriteWeb, LexisNexis, https://advance.lexis.com/api/permalink/33dd79e2-90f5-409d-ae27-5a2c7e86bf31/?context=1000516>. (dated Aug. 14, 2013) 2 pages.

(Continued)

*Primary Examiner* — Nga B Nguyen
(74) *Attorney, Agent, or Firm* — Erise IP, P.A.

(57) ABSTRACT

Method, apparatus and computer program product for facilitating event creation and modification in a group-based communication platform are described herein.

20 Claims, 7 Drawing Sheets

(56) References Cited

U.S. PATENT DOCUMENTS

| | | | | |
|---|---|---|---|---|
| 2014/0288990 | A1* | 9/2014 | Moore | G06Q 10/1093 705/7.19 |
| 2014/0372162 | A1* | 12/2014 | Dhara | G06Q 10/1095 705/7.19 |
| 2015/0058057 | A1* | 2/2015 | Egan | G06Q 10/1095 705/7.19 |
| 2015/0088784 | A1* | 3/2015 | Dhara | G06N 5/02 706/11 |
| 2015/0149544 | A1* | 5/2015 | Zhang | G06Q 10/109 709/204 |
| 2016/0140508 | A1* | 5/2016 | Ossia | G06Q 10/1095 705/7.19 |
| 2017/0039527 | A1* | 2/2017 | Rangan | G06Q 10/1095 |
| 2017/0093967 | A1* | 3/2017 | Grosz | H04L 67/53 |
| 2017/0116581 | A1* | 4/2017 | Shah | G06Q 10/1097 |
| 2017/0357904 | A1* | 12/2017 | Adler | G06Q 10/109 |
| 2018/0218734 | A1* | 8/2018 | Somech | G06N 20/00 |
| 2018/0287982 | A1 | 10/2018 | Draeger et al. | |
| 2019/0130364 | A1* | 5/2019 | Sun | G06Q 10/1093 |
| 2019/0340554 | A1* | 11/2019 | Dotan-Cohen | G06Q 10/06313 |

OTHER PUBLICATIONS

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 13 pages.

Adrienne LaFrance, "The Triumph of Email", Atlantic Online, LexisNexis, https://advance.lexis.com/api/permalink/32d7ddd9-d4c1-4a73-86f7-08ab5842fde6/?context=1000516, (dated Jan. 6, 2016) 5 pages.

David Auberbach, "Re-Animator. How Stewart Butterfield created Flickr and Slack out of the ashes of failed projects" [online][retrieved May 9, 2019]. Retrieved from the Internet: <URL: https://slate.com/business/2014/05/stewart-butterfield-flickr-and-slack-how-he-snatched-victory-from-the-jaws-of-defeat.html>. (dated May 28, 2014) 8 pages.

Ernie Smith, "Picking Up the Slack", Tedium, [online][retrieved May 9, 2019]. Retrieved from the Internet: <URL: https://tedium.co/2017/10/17/irc-vs-slack-chat-history/>. (dated Oct. 17, 2017) 13 pages.

Internet Relay Chat, Wikipedia, [online][retrieved May 30, 2019]. Retrieved from the Internet: <URL: https://en.wikipedia.org/wiki/Internet_Relay_Chat>. (dated May 28, 2019) 20 pages.

Jonathan Vanian, "Why these startups think chat apps are the next big thing in workplace collaboration", Gigaom, LexisNexis, https://advance.lexis.com/api/permalink/e83778c8-09c8-43aa-9ba0-88526283de69/?context=1000516, (dated Aug. 1, 2014) 4 pages.

Matsumoto, T. et al., "Chocoa Communicator—A New Communication System Based on Awareness and Text Communications—", Fujitsu Sci. Tech. J., 36, 2, (Dec. 2000) 154-161.

Matthew Ingram, "Flickr co-founder launches Slack, an all-in-one messaging tool designed to kill email forever", Gigaom, LexisNexis, https://advance.lexis.com/api/permalink/0b676b7c-aec3-4560-861e-d030d1dd008c/?context=1000516, (dated Feb. 12, 2014), 2 pages.

Michael Carney, "Slack is thriving on a cocktail of whimsy and great timing", PandoDaily, LexisNexis, https://advance.lexis.com/api/permalink/dd2d4ee5-2ddf-4d3a-a1d9-3bcee5e38b74/?context=1000516, (dated Feb. 6, 2015, 2:12 AM) 3 pages.

Mike Issac, "Slack, a Start-Up With an App to Foster Business Collaboration, Is Valued at $1.1 Billion", The New York Times Blogs (BITS), LexisNexis, https://advance.lexis.com/api/permalink/3eb84b34-a8f9-4d7d-9573-89d9598a4963/?context=1000516>. (dated Oct. 31, 2014) 2 pages.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.

Rebecca Walberg, "Email biggest office waste of time: survey", National Post, At FP10, LexisNexis, https://advance.lexis.com/api/permalink/96268e3f-26ad-48ac-a98f-6c39804ebded/?context=1000516, (dated Mar. 4, 2014) 2 pages.

Robert Hof, "Stewart Butterfield on How Slack Became a $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015), 3 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.

* cited by examiner

METHOD, APPARATUS AND COMPUTER PROGRAM PRODUCT FOR IMPROVING EVENT CREATION AND MODIFICATION IN A GROUP-BASED COMMUNICATION PLATFORM

CROSS-REFERENCE TO RELATED APPLICATIONS

This application is a continuation application claiming priority benefit, with regard to all common subject matter, of U.S. patent application Ser. No. 16/263,969, filed Jan. 31, 2019, and entitled "METHOD, APPARATUS AND COMPUTER PROGRAM PRODUCT FOR IMPROVING EVENT CREATION AND MODIFICATION IN A GROUP-BASED COMMUNICATION PLATFORM," which is hereby incorporated by reference in its entirety.

BACKGROUND

Applicant has identified many deficiencies and problems associated with existing methods, apparatus, and systems related to electronic calendar or scheduling services. For example, many calendar services fail to overcome technical challenges associated with event creation, modification, and sharing.

BRIEF SUMMARY

In accordance with various embodiments, an apparatus comprising at least one processor and at least one non-transitory memory comprising program code is provided. The at least one non-transitory memory and the program code configured to, with the at least one processor, cause the apparatus to at least receive, from a plurality of client devices, a plurality of electronic messages associated with a group-based communication channel identifier; generate, based upon an analysis of the plurality of electronic messages associated with the group-based communication channel identifier, an event generation request; transmit the event generation request to a calendar service, the event generation request comprising a request for an event object and an event object metadata set, wherein the event object metadata set comprises a time parameter, a location parameter, an attendee parameter, wherein at least one of the time parameter, the location parameter, and the attendee parameter is based on the analysis of the plurality of electronic messages; receive the event object from the calendar service; and transmit the event object renderable for display within an interface associated with the group-based communication channel identifier.

In some embodiments, analyzing the plurality of electronic messages associated with the group-based communication channel identifier further causes the apparatus to: perform natural language processing on the plurality of electronic messages; and determine contextual information associated with the plurality of electronic messages.

In some embodiments, the apparatus is further configured to: based on the contextual information associated with the plurality of electronic messages, generate an event generation prompt; and transmit the event generation prompt to a client device of the plurality of client devices.

In some embodiments, the apparatus is further configured to: based on the contextual information associated with the plurality of electronic messages, identify a plurality of document objects associated with the event generation request; and connect the plurality of document objects to the event object.

In some embodiments, the apparatus is further configured to: identify a workplace object associated with the plurality of client devices; and generate the location parameter based at least in part on the workplace object.

In some embodiments, workplace object comprises workplace object metadata set, and the workplace object metadata set indicates location capacities.

In some embodiments, the apparatus is further configured to: receive an event object sharing request from a first client device of the plurality of client devices; in response to receiving the event object sharing request, generate an event object sharing link; transmit an electronic message to the first client device, wherein the electronic message comprises the event object sharing link; receive an electronic selection on the event object sharing link from a second client device of the plurality of client devices; and in response to receiving the electronic selection on the event object sharing link, authenticate the second client device.

In some embodiments, the calendar service is a third-party calendar service.

In accordance with various embodiments, a computer-implemented method is provided. The computer-implemented method comprises receiving, from a plurality of client devices, a plurality of electronic messages associated with a group-based communication channel identifier; generating, based upon an analysis of the plurality of electronic messages associated with the group-based communication channel identifier, an event generation request; transmitting the event generation request to a third-party calendar service, the event generation request comprising a request for an event object and an event object metadata set, wherein the event object metadata set comprises a time parameter, a location parameter, an attendee parameter, wherein at least one of the time parameter, the location parameter, and the attendee parameter is based on the analysis of the plurality of electronic messages; receiving the event object from the third-party calendar service; and transmitting the event object renderable for display within an interface associated with the group-based communication channel identifier.

In accordance with various embodiments of the present disclosure, a computer program product is provided. The computer program product comprises at least one non-transitory computer-readable storage medium having computer-readable program code portions stored therein. The computer-readable program code portions comprises an executable portion configured to: receive, from a plurality of client devices, a plurality of electronic messages associated with a group-based communication channel identifier; generate, based upon an analysis of the plurality of electronic messages associated with the group-based communication channel identifier, an event generation request; transmit the event generation request to a third-party calendar service, the event generation request comprising a request for an event object and an event object metadata set, wherein the event object metadata set comprises a time parameter, a location parameter, an attendee parameter, wherein at least one of the time parameter, the location parameter, and the attendee parameter is based on the analysis of the plurality of electronic messages; receive the event object from the third-party calendar service; and transmit the event object renderable for display within an interface associated with the group-based communication channel identifier.

In accordance with various embodiments of the present disclosure, a system is provided. The system comprises at least one repository and at least one server. The at least one server comprises at least one processor and at least one non-transitory memory comprising program code. The at least one non-transitory memory and the program code are configured to, with the at least one processor, cause the system to at least: receive, from a plurality of client devices, a plurality of electronic messages associated with a group-based communication channel identifier; generate, based upon an analysis of the plurality of electronic messages associated with the group-based communication channel identifier, an event generation request; transmit the event generation request to a calendar service, the event generation request comprising a request for an event object and an event object metadata set, wherein the event object metadata set comprises a time parameter, a location parameter, an attendee parameter, wherein at least one of the time parameter, the location parameter, and the attendee parameter is based on the analysis of the plurality of electronic messages; receive the event object from the calendar service; and transmit the event object renderable for display within an interface associated with the group-based communication channel identifier.

The above summary is provided merely for the purpose of summarizing some example embodiments to provide a basic understanding of some aspects of the disclosure. Accordingly, it will be appreciated that the above-described embodiments are merely examples and should not be construed to narrow the scope or spirit of the disclosure. It will be appreciated that the scope of the disclosure encompasses many potential embodiments in addition to those here summarized, some of which will be further described below.

BRIEF DESCRIPTION OF THE DRAWINGS

Figure 1:
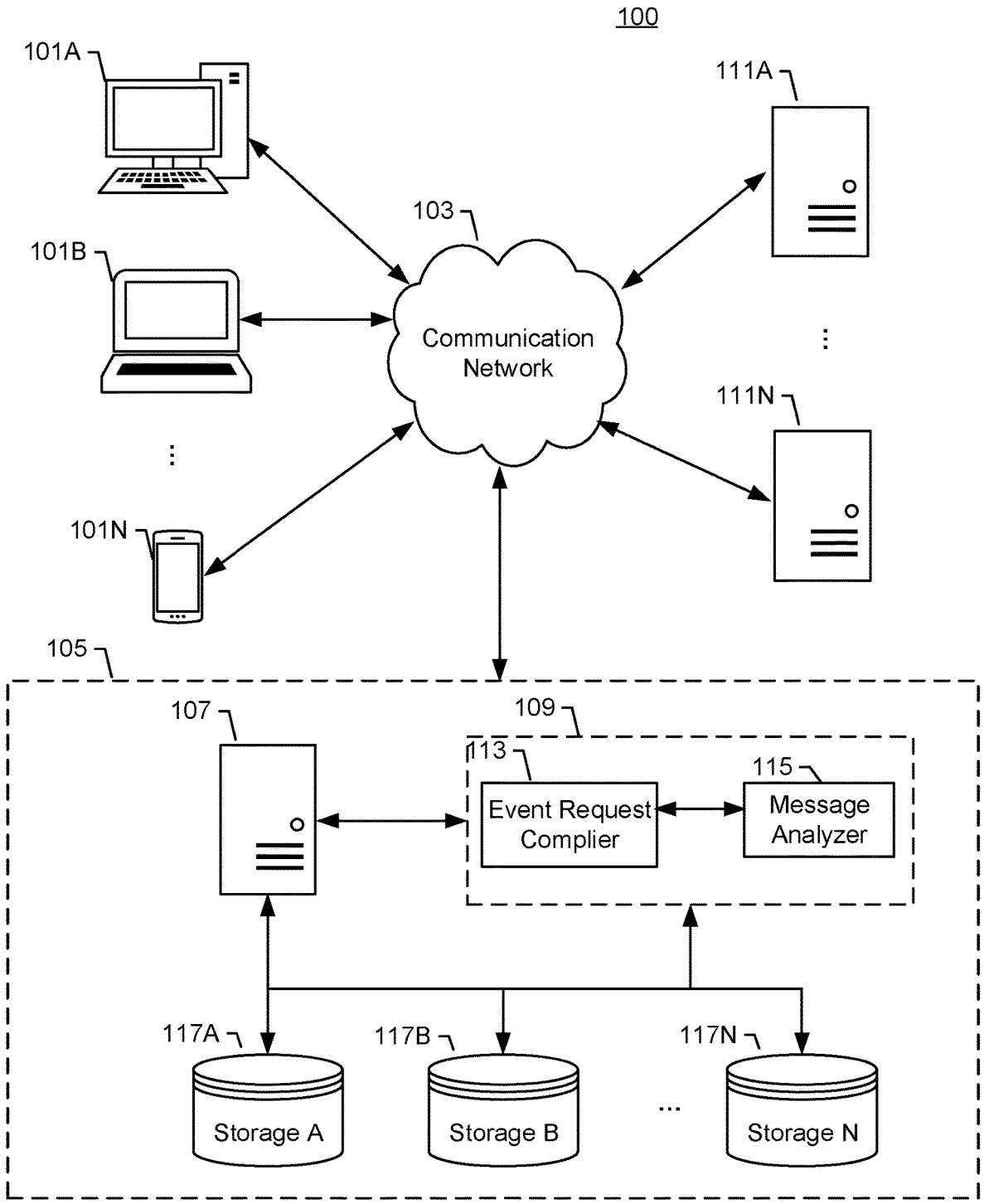
Figure 2:
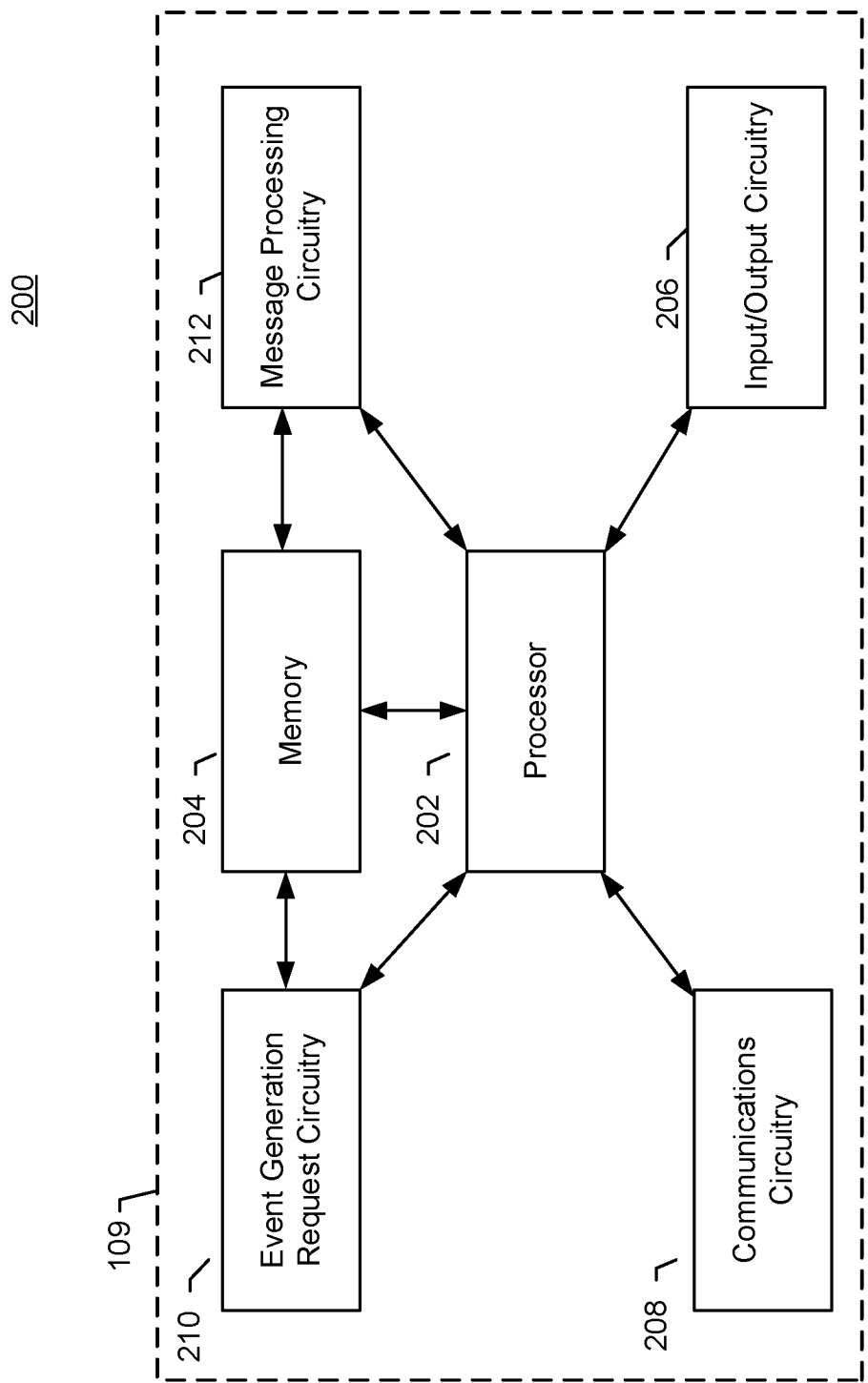
Figure 3:
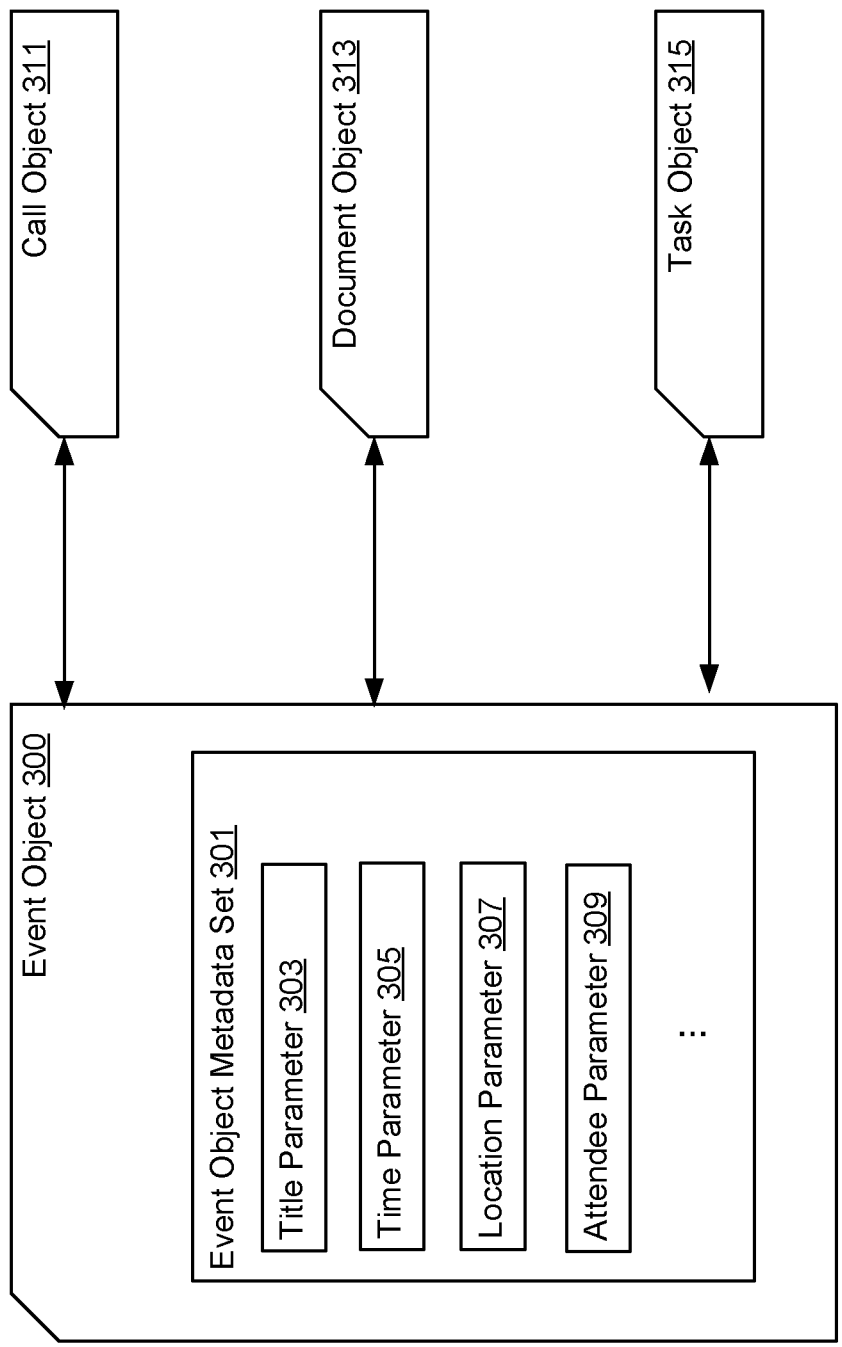
Figure 4:
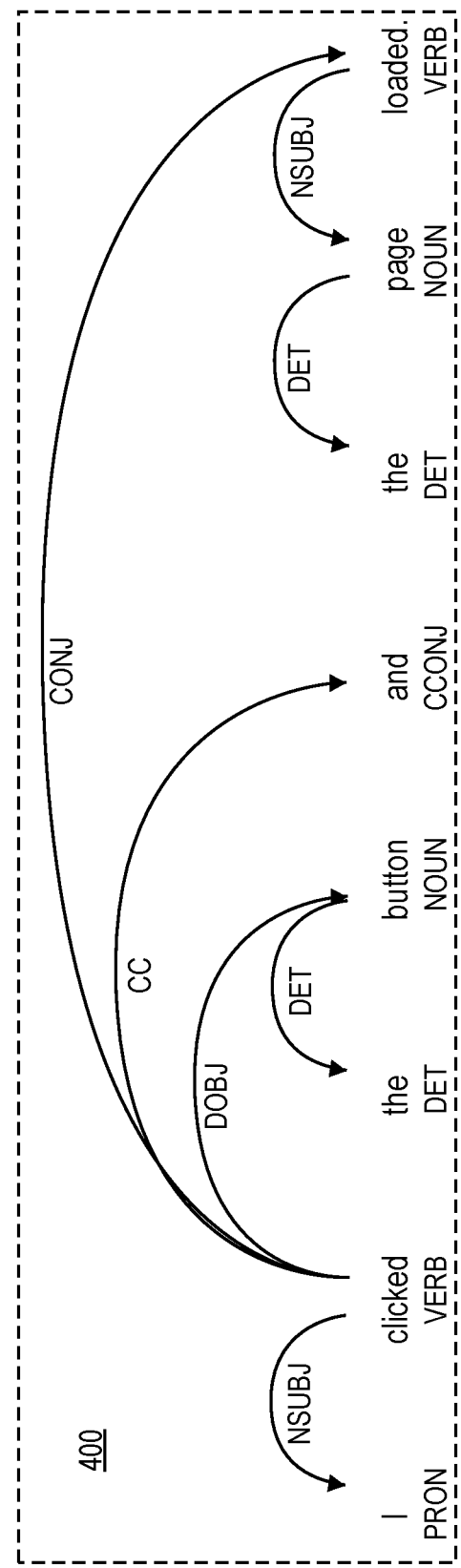
Figure 5:
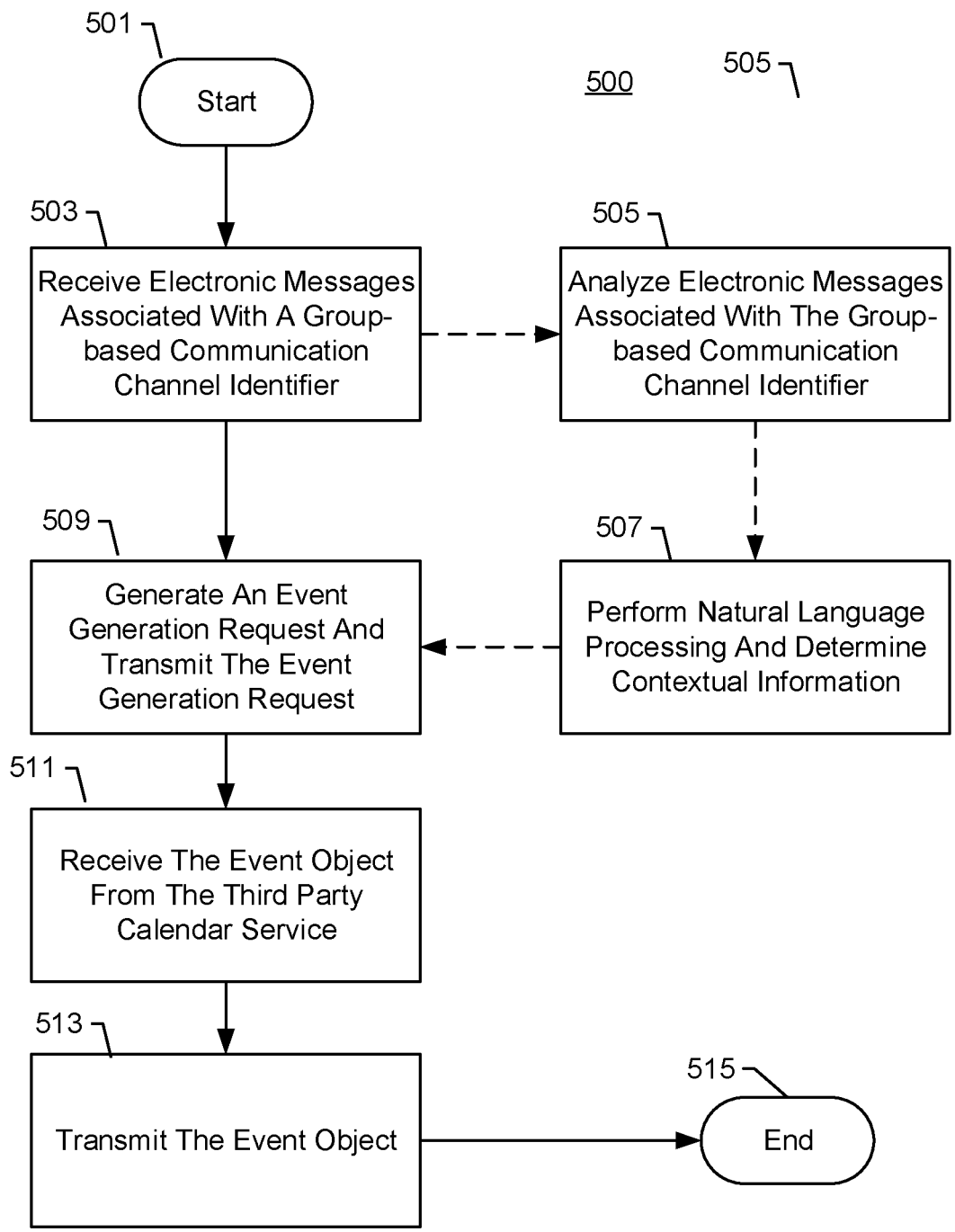
Figure 6:
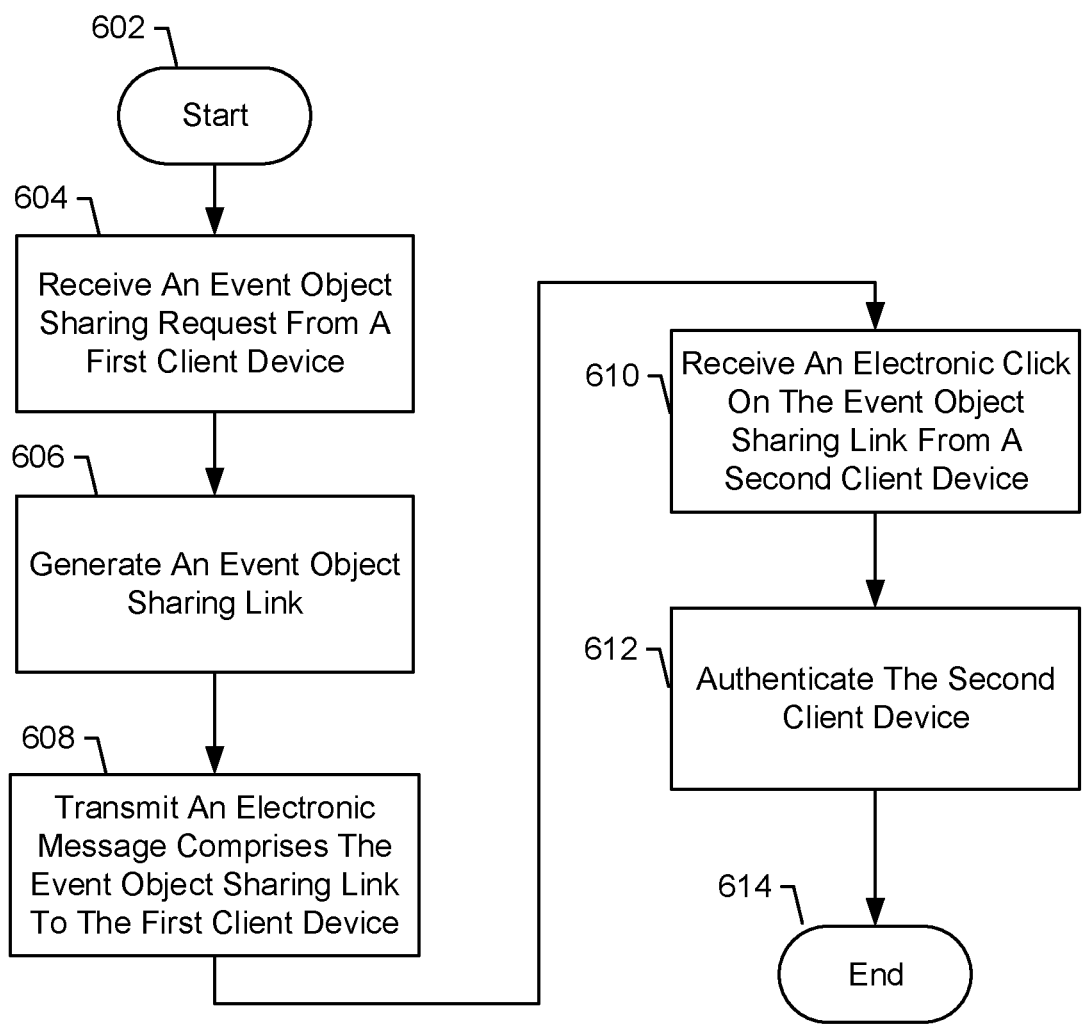
Figure 7:
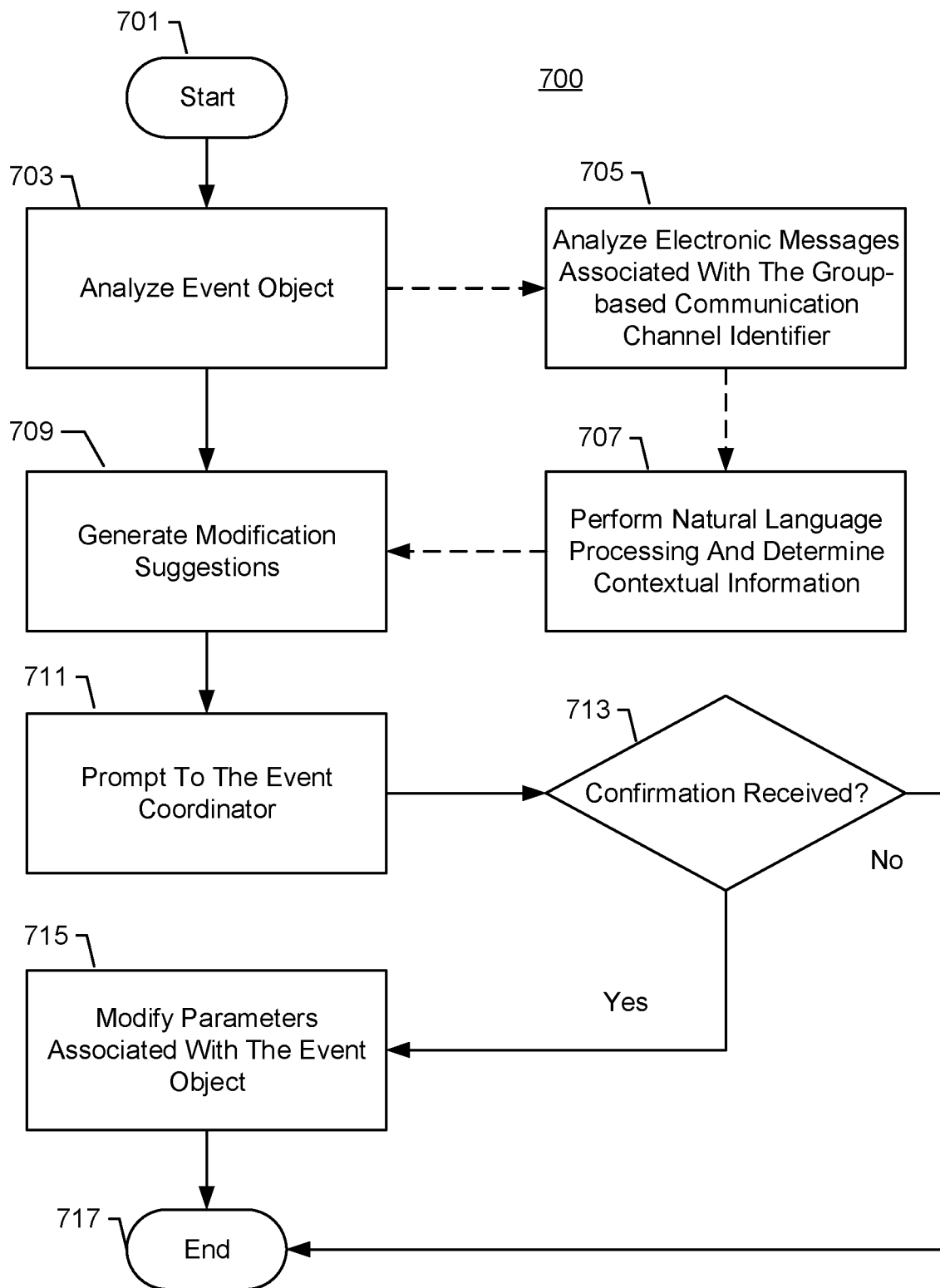

Having thus described some embodiments in general terms, references will now be made to the accompanying drawings, which are not necessarily drawn to scale, and wherein:

FIG. 1 is an example system architecture diagram illustrating an example group-based communication platform in communication with other devices in accordance with some embodiments of the present disclosure;

FIG. 2 is an example infrastructure diagram illustrating an example apparatus in accordance with some embodiments of the present disclosure;

FIG. 3 is a diagram illustrating example data objects in accordance with some embodiments of the present disclosure;

FIG. 4 is an example diagram illustrating example natural language processing in accordance with some embodiments of the present disclosure;

FIG. 5 is an example flowchart illustrating an example method in accordance with some embodiments of the present disclosure;

FIG. 6 is an example flowchart illustrating an example method in accordance with some embodiments of the present disclosure; and FIG. 7 is an example flowchart illustrating an example method in accordance with some embodiments of the present disclosure.

DETAILED DESCRIPTION OF VARIOUS EMBODIMENTS

Various embodiments of the present disclosure are described more fully hereinafter with reference to the accompanying drawings, in which some, but not all embodiments of the disclosure are shown. Indeed, the disclosure may be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative," "example," and "exemplary" are used to be examples with no indication of quality level. Like numbers refer to like elements throughout.

The term "comprising" means "including but not limited to," and should be interpreted in the manner it is typically used in the patent context. Use of broader terms such as "comprises," "includes," and "having" should be understood to provide support for narrower terms such as "consisting of," "consisting essentially of" and "comprised substantially of."

The phrases "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

Overview

Various embodiments of the present disclosure relate generally to event creation, sharing, and modification in network systems. More specifically, various embodiments of the present disclosure are related to a group-based communication platform that intelligently generates event generation requests. Further, various embodiments of the present disclosure provide means for secured sharing of an event, and modifying the event object to reduce resource consumption.

Technical challenges exist in electronically creating and sharing events. For example, many calendar services require a user to manually enter data associated with a to-be-created event, which may cause errors and inconsistencies. A user may choose an event location (such as a conference room) that does not have the capacity (or has over-capacity) to house all attendees of the event. As another example, many users fail to recognize unique requirements (such as the need for video conference equipment) when scheduling an event. In addition, these systems fail to provide modification to event based on information related to, for example, the attendee, topics, or locations. Further, these calendar services do not provide secured sharing of an event with other users.

In contrast, systems structured in accordance with various embodiments of the disclosure provide specific, technical solutions to these technical problems faced by calendar services. For example, various embodiments of the disclosure analyze electronic messages associated with a group-based communication channel (including, for example, performing natural language processing to determine contextual information). Based on the contextual information, various embodiments of the disclosure further generate one or more parameters associated with an to-be-generated event object. In addition, various embodiments of the disclosure generate a unique event object sharing link, and authenticate client devices that select the event object sharing link prior to sharing the event with these client devices. Further, by modifying the event object prior to the event occurring, various embodiments of the disclosure reduce office resource waste and improve system efficiency.

As a result, various embodiments of the present disclosure reduce latency in event creation, improve security in event sharing, and reduce office resource waste, details of which are described hereinafter.

Definitions

As used herein, the terms "data," "content," "digital content," "digital content object," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like (sometimes referred to herein as a "network"). Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The term "circuitry" should be understood broadly to include hardware and, in some embodiments, software for configuring the hardware. With respect to components of the apparatus, the term "circuitry" as used herein should therefore be understood to include particular hardware configured to perform the functions associated with the particular circuitry as described herein. For example, in some embodiments, "circuitry" may include processing circuitry, storage media, network interfaces, input/output devices, and the like.

The term "user" should be understood to refer to an individual, group of individuals, business, organization, and the like. The users referred to herein may access a group-based communication platform using client devices (as defined herein).

The term "user identifier" refers to an identifier that uniquely identifies information stored in a group-based communication platform that is related to a user. Information related to a user may be stored in a "user profile," "user account," or "user account details," which may include one or more group-based communication channel identifiers associated with group-based communication channels that the user has been granted access privileges to, one or more group identifiers for groups that the user has been granted access privileges to, an indication as to whether the user is an owner of any group-based communication channels, an indication as to whether the user has any group-based communication channel restrictions, a plurality of messages, a plurality of emojis, a plurality of conversations, a plurality of conversation topics, an avatar, an email address, a real name (e.g., John Doe), a username (e.g., jdoe), a password, a real name, a time zone, a status, and the like. The user account details can include a subset designation of user credentials, such as, for example, login information for the user including the user's username and password.

The term "client device" refers to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, enterprise computers, and the like.

The term "group-based communication platform" refers to a system or virtual environment that has security sufficient such that it is accessible only to a defined group of users, thus enabling the defined group of users to communicate with each other through the system or virtual environment. The group may be defined by common access credentials such as those of an organization or commercial enterprise. Access may further be facilitated by a validated request to join or an invitation to join transmitted by one group member user to another non-member user. Group identifiers (defined below) are used to associate data, information, messages, etc., with specific groups. The group-based communication platform may take the form of one or more central servers disposed in communication with one or more additional servers running software applications, and having access to one or more databases storing digital content items, application-related data, and/or the like.

The term "group-based communication channel" refers to a virtual communication environment or feed that is configured to display messaging communications posted by "channel members" (e.g., validated users accessing the environment using client devices) that are viewable only to the members of the group. The format of the group-based communication channel may appear differently to different members of the group-based communication channel. However, the content of the group-based communication channel (i.e., messaging communications) will be displayed to each member of the group-based communication channel. For instance, a common set of group-based messaging communications will be displayed to each member of the respective group-based communication channel such that the content of the group-based communication channel (i.e., messaging communications) will not vary per member of the group-based communication channel.

The term "private group-based communication channel" refers to a group-based communication channel with restricted access such that it is not generally accessible and/or searchable by other members of the group-based communication system. For example, only those users or administrators who have knowledge of and permission to access (e.g., a group-based communication channel identifier for the private group-based communication channel is associated with their user profile after the user has been validated/authenticated) the private group-based communication channel may view content of the private group-based communication channel.

The terms "group identifier" or "team identifier" refer to one or more items of data by which a group-based communication platform may use to uniquely identify a group within the group-based communication system. For example, a group identifier may comprise ASCII (American Standard Code for Information Interchange) text, a memory address, and the like.

The terms "channel identifier" or "group-based communication channel identifier" refer to one or more items of data by which the group-based communication platform may use to uniquely identify a group-based communication channel. For example, a channel identifier may comprise ASCII text, a memory address, and the like.

The terms "electronic message," "messaging communication," or "message" refer to electronically generated data object provided by a user using a client device and that is configured for display within a group-based communication channel. Message communications may include any text, image, video, audio or combination thereof provided by a user (using a client device). For instance, the user may provide a messaging communication that includes text as well as an image and a video within the messaging communication as message contents. In such a case, the text, image, and video would comprise the messaging communication or data object. Each message sent or posted to (i.e., transmitted for rendering within an interface of) a group-based communication channel of the group-based communication system includes metadata comprising the following: a sending user identifier, a message identifier, message contents, a group identifier, and a group-based communication channel identifier. Each of the foregoing identifiers may comprise ASCII text, a pointer, a memory address, and the like.

The term "data object" refers to a data structure that represents one or more functionalities and characteristics associated with the group-based communication platform. For example, an "event object" represents a calendar event associated with the group-based communication platform and may be generated by a third-party calendar service. A "document object" represents a computer file that is associated with the group-based communication platform. A "workplace object" describes the physical work environment (such as conference rooms in an office building) associated with the group-based communication platform and/or the client devices in communication with the group-based communication platform. Details of these example data objects are described further hereinafter.

Each data object may contain a value or a group of values. Such values may include, for example, a "metadata" associated with the data object. The term "metadata" refers to a parameter that indicates an attribute of the data object. The term "metadata set" refers to a collective depository of metadata associated with the data object.

For example, an "event object metadata set" associated with an event object may include metadata such a time parameter (which indicates the time attribute, such as the starting or ending time of the event) and a location parameter (which indicates the location of the calendar event). Other parameters in the event object metadata set may include, such as but not limited to, title parameter, details parameter, attendee parameter, owner/organizer parameter, details of which are described hereinafter.

In various embodiments of the present disclosure, a data object may be generated in response to a "generation request," which is an electronic request for the generation of a data object. For example, a user operating a client device in communication with the group-based communication platform may submit an event generation request to request the group-based communication platform to generate an event object. Such event generation request may be in the form of an electronic message associated with a group-based communication channel. Upon receiving the event generation request, the group-based communication platform may generate an event object by analyzing electronic messages associated with the group-based communication channel, details of which are described hereinafter. In embodiments, the event generation request may be submitted to a third-party calendar service, in the form of an electronic request within the third-party calendar service separate from the group-based communication platform.

In various embodiments of the present disclosure, one or more electronic "prompts" may be generated. A prompt is an electronic notification that may suggest one or more actions associated with a data object. For example, a server circuitry may generate an event generation prompt, which is an electronic notification that suggests the generation of an event, details of which are described hereinafter. The server circuitry may also generate an electronic prompt for modifying one or more parameters associated with the event object, details of which are described hereinafter.

Example System Architecture for Implementing Embodiments of the Present Disclosure Methods, apparatuses, and computer program products of the present disclosure may be embodied by any of a variety of devices. For example, the method, apparatus, and computer program product of an example embodiment may be embodied by a networked device (e.g., a group-based communication platform), such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1 illustrates an example system architecture 100 within which embodiments of the present disclosure may operate. The system may comprise at least one repository (such as the one or more storages 117A-117N) and at least one server (the event server 109), details of which are described hereinafter.

Users may access a group-based communication platform 105 via a communication network 103 using client devices 101A-101N. The client devices 101A-101N may be a computing device as defined herein. Electronic data received by the group-based communication platform 105 from the client devices 101A-101N may be provided in various forms and via various methods. For example, the client devices 101A-101N may include desktop computers, laptop computers, smartphones, netbooks, tablet computers, wearables, and the like.

In embodiments where a client device of client devices 101A-101N is a mobile device, such as a smart phone or tablet, the client device may execute an "app" to interact with the group-based communication platform 105. Such apps are typically designed to execute on mobile devices, such as tablets or smartphones. For example, an app may be provided that executes on mobile device operating systems such as IOS®, ANDROID®, or WINDOWS®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications.

Additionally or alternatively, the client devices 101A-101N may interact with the group-based communication platform 105 via a web browser or through a web application that runs in a web browser. As yet another example, the client devices 101A-101N may include various hardware or firmware designed to interface with the group-based communication platform 105.

Communication network 103 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communication network 103 may include a cellular telephone, an 802.11, 802.16, 802.20, and/or WiMax network. Further, the communication network 103 may include a public network, such as the Internet, a private network, such as an intranet, or combinations thereof, and may utilize a variety of networking protocols including, but not limited to, TCP/IP based networking protocols. For instance, the networking protocol may be customized to suit the needs of the group-based communication platform 105. In some embodiments, the protocol is a custom protocol of JSON (JavaScript Object Notation) objects sent via a Websocket channel. In some embodiments, the protocol is JSON over RPC, JSON over REST/HTTP, and the like.

In various embodiments of the present disclosure, an electronic message, an event generation request and/or an event object sharing request may be sent to the group-based communication platform 105. In various implementations, the electronic message, the event generation request, and/or the event object sharing request may be sent to the group-based communication platform 105 over communication network 103 directly by a client device of client devices 101A-101N. The electronic message, the event generation request, and/or the event object sharing request may be also sent to the group-based communication platform 105 via an intermediary.

In some embodiments, the group-based communication platform 105 comprises a message server 107, an event server 109, and one or more storages 117A-117N.

The message server 107 may be embodied as a computer or computers. The message server 107 may provide for receiving electronic data from various sources including, but not limited to, the client devices 101A-101N. For example, the message server 107 may be operable to receive and post or transmit group-based electronic messages provided by the client devices 101A-101N via communication network 103.

The event server 109 receives and/or generates event generation requests via the event request complier 113, and analyzes the electronic messages via the message analyzer 115, details of which are described hereinafter.

The one or more storages 117A-117N may be embodied as a data storage device such as a Network Attached Storage (NAS) device or devices, or as a separate server or servers. The one or more storages 117A-117N include information accessible to the message server 107 and the event server 109.

It is noted that various components in the event server 109 may leverage the same computer or computing apparatus to perform the above-described operations. Similarly, various components of the message server 107 may leverage the same computer or computing apparatus to perform the above-described operations, and various components of the one or more storages 117A-117N may leverage the same computer or computing apparatus to perform the above-described operations.

As shown in FIG. 1, the group-based communication platform 105 may be in communication with one or more third-party calendar service servers 111A-111N via the communication network 103. The one or more third-party calendar service servers 111A-111N may be embodied as computers, and may further provide information regarding third-party calendar services. In various embodiments, the one or more third-party calendar service servers 111A-111N may generate event objects in response to event generation requests. For example, one of the third-party calendar service servers 111A-111N may be a GOOGLE® calendar server, and another may be an OUTLOOK® 365 calendar server. The one or more third-party calendar service servers 111A-111N may implement different calendar server protocols, and provide different calendar service platforms than the group-based communication platform 105. For example, a calendar server protocol may include a protocol for remote client-server calendar access and scheduling based on the XML, HTTP, and other standards. As described in detail hereinafter, various embodiments of the present disclosure overcome technical challenges associated with sharing an event object among the one or more third-party calendar service servers 111A-111N.

Example Apparatus for Implementing Embodiments of the Present Disclosure

The event server 109 of FIG. 1 may be embodied by one or more computing systems, such as apparatus 200 shown in FIG. 2. The apparatus 200 may include processor 202, memory 204, input/output circuitry 206, communications circuitry 208, event generation request circuitry 210, and message processing circuitry 212. The apparatus 200 may be configured to execute the operations described above with respect to FIG. 1 and below with respect to FIGS. 3-7. Although these components 202-212 are described with respect to functional limitations, it should be understood that the particular implementations necessarily include the use of particular hardware. It should also be understood that certain of these components 202-212 may include similar or common hardware. For example, two sets of circuitries may both leverage use of the same processor, network interface, storage medium, or the like to perform their associated functions, such that duplicate hardware is not required for each set of circuitries.

In some embodiments, the processor 202 (and/or co-processor or any other processing circuitry assisting or otherwise associated with the processor) may be in communication with the memory 204 via a bus for passing information among components of the apparatus. The memory 204 is non-transitory and may include, for example, one or more volatile and/or non-volatile memories. In other words, for example, the memory 204 may be an electronic storage device (e.g., a computer-readable storage medium). The memory 204 may be configured to store information, data, content, applications, instructions, or the like for enabling the apparatus to carry out various functions in accordance with example embodiments of the present disclosure.

The processor 202 may be embodied in a number of different ways and may, for example, include one or more processing devices configured to perform independently. In some preferred and non-limiting embodiments, the processor 202 may include one or more processors configured in tandem via a bus to enable independent execution of instructions, pipelining, and/or multithreading. The use of the term "processor" or "processing circuitry" may be understood to include a single core processor, a multi-core processor, multiple processors internal to the apparatus, and/or remote or "cloud" processors.

In some preferred and non-limiting embodiments, the processor 202 may be configured to execute instructions stored in the memory 204 or otherwise accessible to the processor 202. In some preferred and non-limiting embodiments, the processor 202 may be configured to execute hard-coded functionalities. As such, whether configured by hardware or software methods, or by a combination thereof, the processor 202 may represent an entity (e.g., physically embodied in circuitry) capable of performing operations according to an embodiment of the present disclosure while configured accordingly. Alternatively, as another example, when the processor 202 is embodied as an executor of software instructions, the instructions may specifically configure the processor 202 to perform the algorithms and/or operations described herein when the instructions are executed.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface circuitry and may include a display, which may comprise a web user interface, a mobile application, a client device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network (such as the communication network 103 as shown in FIG. 1). For example, the communications circuitry 208 may include one or more network interface cards, antennae, buses, switches, routers, modems, and supporting hardware and/or software, or any other device suitable for enabling communications via a network. Additionally or alternatively, the communications circuitry 208 may include the circuitry for interacting with the antenna/antennae to cause transmission of signals via the antenna/antennae or to handle receipt of signals received via the antenna/antennae.

The event generation request circuitry 210 includes hardware configured to generate and modify event generation requests, details of which are described hereinafter. The event generation request circuitry 210 may utilize processing circuitry, such as the processor 202, to perform these actions. The event generation request circuitry 210 may store the event generation requests in the memory 204. In some embodiments, the event generation request circuitry 210 may include a separate processor, specially configured Field Programmable Gate Array (FPGA), or Application Specific Integrated Circuit (ASIC). The event generation request circuitry 210 may be implemented using hardware components of the apparatus configured by either hardware or software for implementing the functions described herein.

The message processing circuitry 212 includes hardware configured to analyze electronic messages. The message processing circuitry 212 may utilize processing circuitry, such as the processor 202, to perform these actions. However, it should also be appreciated that, in some embodiments, the message processing circuitry 212 may include a separate processor, specially configured Field Programmable Gate Array (FPGA), or Application Specific Integrated Circuit (ASIC) for performing the functions described herein. The message processing circuitry 212 may be implemented using hardware components of the apparatus configured by either hardware or software for implementing these planned functions.

It is also noted that all or some of the information discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

In some embodiments, other elements of the apparatus 200 may provide or supplement the functionality of particular circuitry. For example, the processor 202 may provide processing functionality, the memory 204 may provide storage functionality, the communications circuitry 208 may provide network interface functionality, and the like. As will be appreciated, any such computer program instructions and/or other type of code may be loaded onto a computer, processor or other programmable apparatus's circuitry to produce a machine, such that the computer, processor or other programmable circuitry that execute the code on the machine creates the means for implementing various functions, including those described herein.

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Example Methods for Implementing Embodiments of the Present Disclosure

Various methods described hereinafter provide technical improvements over computer functionalities. For example, various methods described herein facilitate event creation and modification in a group-based communication platform by utilizing an event object based on, for example, electronic messages associated with a group-based communication channel.

It is noted that each block of the flowchart, and combinations of blocks in the flowchart, may be implemented by various means such as hardware, firmware, circuitry and/or other devices associated with execution of software including one or more computer program instructions. For example, one or more of the procedures described in FIGS. 5-7 may be embodied by computer program instructions, which may be stored by a non-transitory memory of an apparatus employing an embodiment of the present disclosure and executed by a processor in the apparatus. These computer program instructions may direct a computer or other programmable apparatus to function in a particular manner, such that the instructions stored in the computer-readable storage memory produce an article of manufacture, the execution of which implements the function specified in the flowchart block(s).

Event Object in a Group Based Communication Platform

Referring now to FIG. 3, an example event object 300 in accordance with example embodiments of the present disclosure is illustrated. As describe above, an event object represents a calendar event. The event object may include an event object metadata set, and the event object metadata set may include various parameters describing the event object.

For example, as shown in FIG. 3, the event object 300 may include event object metadata set 301, and the event object metadata set 301 may include the title parameter 303, the time parameter 305, the location parameter 307, the attendee parameter 309, etc.

The title parameter 303 describes the title associated with the calendar event (for example, "product release conference"). The time parameter 305 describes the date, starting time and ending time associated with the calendar event (for example, "2 p.m. to 3 p.m. on Jan. 2, 2019"). In various embodiments, the time parameter 305 is a digital representation of the network system time. In various embodiments of the present disclosure, a server circuitry may execute the following programming code to obtain the time parameter 305 of the event object metadata set 301 associated with the event object 300:

```
message LocalDate {
    int32 year;
    int32 month;
}
message DateTime {
    oneof value {
        int64 date_time; // epoch seconds
        LocalDate date; // all-day
    }
}
```

The location parameter 307 describes the location associated with the calendar event (for example, "Conference Room A"). The attendee parameter 309 indicates users (for example, channel members) who are invited to the calendar event and their responses to the invitation (e.g. acceptance or decline of the invitation). In various embodiments of the present disclosure, a server circuitry may execute the following programming code to obtain the attendee parameter 309 of the event object metadata set 301 associated with the event object 300:

```
message Attendee {
    string email;
    string name;
    // whether the attendee is expected to respond to this invite
    bool is_rsvp_requested;
    AttendeeRole ; // attendee's role in meeting
    AttendeeStatus status; // attendee's current reply to the invite
    AttendeeType type; // attendee type
}
enum AttendeeRole {
    REQUIRED = 0;
    OPTIONAL = 1;
    CHAIR = 2;
    NONPARTICIPANT = 3;
}
enum AttendeeStatus {
    NEEDS_ACTION = 0;
    ACCEPTED = 1;
    DECLINED = 2;
    TENTATIVE = 3;
    DELEGATED = 4;
}
enum AttendeeType {
    INDIVIDUAL = 0;
    GROUP = 1;
    RESOURCE = 2;
    ROOM = 3;
    UNKNOWN = 4;
}
```

The event object metadata set 301 of the event object 300 may further include additional parameters. For example, the event object metadata set 301 may include a details parameter. The details parameter may include a text string that describes the details of the event, such as but not limited to, the agenda of the event.

The event object metadata set 301 may include an owner/organizer parameter, which describes the owner or organizer of this calendar event. The owner/organizer parameter may be a text string that identifies the creator of the event. In some embodiments, the owner/organizer parameter may be an email address. In some embodiments, the owner/organizer parameter may be a user identifier as described above. In various embodiments of the present disclosure, a server circuitry may execute the following programming code to obtain the owner/organizer parameter associated with the event object 300:

```
message Organizer {
    string email;
    string name;
}
```

The event object metadata set 301 may include visibility parameters that describe the visibility of the calendar event to a channel member in the group-based communication channel. Such visibilities may include, for example, whether to render the calendar event for display on the user's connected calendars from third-party calendar service platforms, and whether the calendar event is shared in a public group-based communication channel or a private group-based communication channel. Further, visibilities may include access control.

In various embodiments of the present disclosure, some of the parameters in the event object metadata set 301 are mandatory for an event object, while other parameters may be optional. For example, the title parameter 303, the time parameter 305, the owner/organizer parameter, and the visibility parameter may be mandatory, and an event object may not be generated without these parameters.

In addition, one or more other data objects may be attached to the event object 300. For example, as shown in FIG. 3, a call object 311, a document object 313, and a task object 315 are attached to the event object 300. The call object 311 may represent a video conference call associated with the event object 300. The document object 313 may represent electronic documents associated with the event object 300. Such electronic documents may include, for example, call notes, transcripts, summary posts, documents shared by the channel members during the event, and video recordings from the event. The task object 315 may represent action items associated with the event object 300.

In some embodiments, an event object may be created by a third-party calendar service (such as the one or more third-party calendar service servers 111A-111N), and the third-party calendar service may render and display event objects. In various embodiments, electronic messages may be generated by the group-based communication platform as reminders of the events to channel members associated with the group-based communication channel.

For example, the group-based communication platform may generate a "daily summary" electronic message at a pre-determined time every day (such as 9 A.M. PST), and transmit the "daily summary" to the group-based communication channel. The "daily summery" may list all events associated with the group-based communication channel for that day, based on the time parameter associated with the event object metadata set of the event objects as described above. Additionally or alternatively, the group-based communication platform may generate electronic messages at a per-determined time period prior to the starting time of calendar events, and transmit such electronic messages to the group-based communication channel as reminders, based on the time parameter associated with the event object metadata set of the event objects as described above. For example, the group-based communication platform may generate an electronic message to the group-based communication channel at fifteen minutes prior to the starting time of an event.

As another example, prior to the starting time of an event and/or during the event, the group-based communication platform may generate an electronic prompt to a client device associated with the event coordinator (for example, based on the owner/organizer parameter in the event object metadata set of the event object). Such electronic prompt may provide an option to the event coordinator to start a private group-based communication channel with attendees of the event (for example, based on the attendee parameter in the event object metadata set of the event object) in the group-based communication platform. The members of the private group-based communication channel are the actual attendees of the event (i.e. those who indicated acceptance of the invitation). The private group-based communication channel allows the attendees of the event to collaborate. For example, the private group-based communication channel may provide an electronic prompt to allow members to indicate that he will be late for the event, or if he won't be able to join the event.

In some embodiments, the group-based communication platform may generate the electronic prompt for the private group-based communication channel at a pre-determined time prior to the start of the event (for example, 10 minutes prior to the starting time of the event). In some embodiments, the private group-based communication channel is temporary so that it is closed as the event ends, or after a pre-determined time after the events ends (for example, 30 minutes after the event ends).

In various embodiments of the present disclosure, one or more parameters of the event object metadata set 301 are programmatically generated based on the electronic messages associated with the group-based communication channel, details of which are described below.

Creating Event Generation Request

As described above, various embodiments of the present disclosure may programmatically determine one or more parameters of an event object metadata set of a to-be-generated event object as indicated by an event generation request, based on electronic messages associated with the group-based communication channel.

In some embodiments of the present disclosure, a server circuitry (such as the message processing circuitry 212 of the event server 109 as shown in FIG. 2) may perform natural language processing on electronic messages associated with a group-based communication channel in real-time to determine contextual information associated with the electronic messages.

For example, the server circuitry (such as the message processing circuitry 212 of the event server 109 as shown in FIG. 2) may receive the following code describing an electronic message, substantially in the form of a (Secure) Hypertext Transfer Protocol ("HTTP(S)") POST message including eXtensible Markup Language ("XML") formatted data:

```
POST /authrequest.php HTTP/1.1
Host: www.server.com
Content-Type: Application/XML
Content-Length: 667
<?XML version = "1.0" encoding = "UTF-8"?>
<auth_request>
   <timestamp>2020-12-31 23:59:59</timestamp>
   <user_accounts_details>
      <user_account_credentials>
         <user_name>ID_user_1</user_name>
         <password>abc123</password>
         //OPTIONAL <cookie>cookieID</cookie>
         //OPTIONAL
   <digital_cert_link>www.mydigitalcertificate.com/
JohnDoeDaDoeDoe@gmail.com/mycertifcate.dc</digital_cert_link>
         //OPTIONAL
   <digital_certificate>_DATA_</digital_certificate>
      </user_account_credentials>
   </user_accounts_details>
   <client_details> //iOS Client with App and Webkit
      <client_IP>10.0.0.123</client_IP>
      <user_agent_string>Mozilla/5.0 (iPhone; CPU iPhone OS 7_1_1 like
Mac OS X) AppleWebKit/537.51.2 (KHTML, like Gecko) Version/7.0
Mobile/11D201 Safari/9537.53</user_agent_string>
      <client_product_type>iPhone6,1</client_product_type>
      <client_serial_number>DNXXX1X1XXXX</client_serial_number>
      <client_UDID>3XXXXXXXXXXXXXXXXXXXXXXXXD</client_UDID>
      <client_OS>iOS</client_OS>
      <client_OS_version>7.1.1</client_OS_version>
      <client_app_type>app with webkit</client_app_type>
      <app_installed_flag>true</app_installed_flag>
      <app_name>MSM.app</app_name>
```

```
    <app_version>1.0 </app_version>
    <app_webkit_name>Mobile Safari</client_webkit_name>
    <client_version>537.51.2</client_version>
  </client_details>
  <client_details> //iOS Client with Webbrowser
    <client_IP>10.0.0.123</client_IP>
    <user_agent_string>Mozilla/5.0 (iPhone; CPU iPhone OS 7_1_1 like
Mac OS X) AppleWebKit/537.51.2 (KHTML, like Gecko) Version/7.0
Mobile/11D201 Safari/9537.53</user_agent_string>
    <client_product_type>iPhone6,1</client_product_type>
    <client_serial_number>DNXXX1X1XXXX</client_serial_number>
    <client_UDID>3XXXXXXXXXXXXXXXXXXXXXXXXD</client_
UDID>
    <client_OS>iOS</client_OS>
    <client_OS_version>7.1.1</client_OS_version>
    <client_app_type>web browser</client_app_type>
    <client_name>Mobile Safari</client_name>
    <client_version>9537.53</client_version>
  </client_details>
  <client_details> //Android Client with Webbrowser
    <client_IP>10.0.0.123</client_IP>
    <user_agent_string>Mozilla/5.0 (Linux; U; Android 4.0.4; en-us;
Nexus S Build/IMM76D) AppleWebKit/534.30 (KHTML, like Gecko)
Version/4.0 Mobile Safari/534.30</user_agent_string>
    <client_product_type>Nexus S</client_product_type>
    <client_serial_number>YXXXXXXXXZ</client_serial_number>
    <client_UDID>FXXXXXXXXX-XXXX-XXXX-XXXX-
XXXXXXXXXXXX</client_UDID>
    <client_OS>Android</client_OS>
    <client_OS_version>4.0.4</client_OS_version>
    <client_app_type>web browser</client_app_type>
    <client_name>Mobile Safari</client_name>
    <client_version>534.30</client_version>
  </client_details>
  <client_details> //Mac Desktop with Webbrowser
    <client_IP>10.0.0.123</client_IP>
    <user_agent_string>Mozilla/5.0 (Macintosh; Intel Mac OS X 10_9_3)
Apple WebKit/537.75.14 (KHTML, like Gecko) Version/7.0.3
Safari/537.75.14</user_agent_string>
    <client_product_type>MacPro5,1</client_product_type>
  <client_serial_number>YXXXXXXXXZ</client_serial_number>
    <client_UDID>FXXXXXXXXX-XXXX-XXXX-XXXX-
XXXXXXXXXXXX</client_UDID>
    <client_OS>Mac OS X</client_OS>
    <client_OS_version>10.9.3</client_OS_version>
    <client_app_type>web browser</client_app_type>
    <client_name>Mobile Safari</client_name>
    <client_version>537.75.14</client_version>
  </client_details>
  <message>
    <sender_identifier>5541263684</sender_identifier>
    <message_identifier>ID_message_10</message_identifier>
    <team_identifier>ID_team_1</team_identifier>
    <channel_identifier>ID_channel_1</channel_identifier>
    <contents>I clicked the button and the page loaded. </contents>
  </message>
</auth_request>
```

In the above example, an electronic message is sent by a client device via a web browser to the group-based communication platform. The content of the electronic message is "I clicked the button and the page loaded." The group identifier associated with this electronic message is ID_team_1, and the channel identifier associated with this electronic message is ID_channel_1.

Upon receiving this electronic message, the server circuitry (such as the message processing circuitry 212 of the event server 109 as shown in FIG. 2) may perform natural language processing on this electronic message to determine its contextual information. For example, the server circuitry (such as the message processing circuitry 212 of the event server 109 as shown in FIG. 2) may perform "part-of-speech tagging" and "dependency phrasing," as shown in the diagram 400 of FIG. 4.

In natural language processing, "part-of-speech tagging" is the process of analyzing a text in the electronic message by breaking down the text into parts based on words within the text. Part-of-speech tagging marks up each word in the text as corresponding to a particular "part of speech" (i.e. words having similar grammatical properties). Examples of "part of speech" may include, for example, noun, verb, adjective, adverb, pronoun, etc.

As shown in FIG. 4, the server circuitry (such as the message processing circuitry 212 of the event server 109 as shown in FIG. 2) may break down text in the example electronic message into eight words, and assign a part of speech to each word:

TABLE 1

Example Part-Of-Speech Tagging

| Word | Part of Speech |
| --- | --- |
| I | pronoun |
| clicked | verb |
| the | determiner |
| button | noun |
| and | coordinating conjunction |
| the | determiner |
| page | noun |
| loaded. | verb |

After performing the "part-of-speech tagging," the server circuitry (such as the message processing circuitry 212 of the event server 109 as shown in FIG. 2) may further perform "dependency phrasing" analysis on the text. The "dependency phrasing" analysis determines the grammatically structure of the text, and establishes relationships between the words within the text.

For example, as shown in FIG. 4, the server circuitry (such as the message processing circuitry 212 of the event server 109 as shown in FIG. 2) may determine that the pronoun "I" is the nominal subject (i.e. syntactic subject) of the verb "clicked." As another example, the server circuitry (such as the message processing circuitry 212 of the event server 109 as shown in FIG. 2) may determine that the noun "button" is the direct object for the verb "clicked," as shown in FIG. 4.

Based on the part-of-speech tagging analysis and the dependency phrasing analysis, the server circuitry (such as the message processing circuitry 212 of the event server 109 as shown in FIG. 2) may determine the contextual information (i.e. meaning) associated with the electronic message, and such contextual information may be used to generate one or more parameters for an event object metadata set, examples of which are described hereinafter.

It is noted that embodiments of the present disclosure are not limited to only the natural language processing methods described above. In some embodiments, other natural language processing methods may be used to determine the contextual information associated with the electronic messages.

Referring now to FIG. 5, an example method 500 for generating an event object in accordance with embodiments of the present disclosure is shown.

The method 500 starts at block 501. At block 503, a server circuitry (such as the event server 109 as shown in FIGS. 1 and 2) may receive a plurality of electronic messages associated with a group-based communication channel identifier. The group-based communication channel identifier may be determined based on, for example, metadata associated with the electronic messages, as described above.

At block 505, a server circuitry (such as the message processing circuitry 212 of the event server 109 as shown in FIG. 2) may analyze the plurality of electronic messages associated with the group-based communication channel identifier. For example, the server circuitry may perform natural language processing on the plurality of electronic messages to determine contextual information associated with the plurality of electronic messages, as shown in block 507. Example embodiments of natural language processing are described in connection with FIG. 4 above.

Additionally, or alternatively, the server circuitry may determine one or more user profiles associated with members of the group-based communication channel. As described above, user profiles store information related to the user, and the server circuitry may perform natural language processing or other machine learning process to determine contextual information associated with the user such as, for example, whether a user would be interested in an event.

At block 509, a server circuitry (such as the event generation request circuitry 210 of the event server 109 as shown in FIG. 2) may generate an event generation request. The event generation request may be in the form of an electronic message that requests creation of an event object (representing a calendar event) by a third-party calendar service (such as the one or more third-party calendar service servers 111A-111N).

With continuing reference to block 509, a server circuitry (such as the event generation request circuitry 210 of the event server 109 as shown in FIG. 2) may generate one or more parameters of an event object metadata set based on the analysis performed at blocks 505 and 507. In various embodiments, the event object metadata set may include a time parameter, a location parameter, an attendee parameter. In various embodiments, at least one of the time parameter, the location parameter, and the attendee parameter is based on the analysis of the plurality of electronic messages described above in connection with blocks 505 and 507.

In some embodiments, to generate the time parameter, the server circuitry (such as the event generation request circuitry 210 of the event server 109 as shown in FIG. 2) may analyze the electronic messages to determine whether a proposed time for the event has been discussed in a group-based communication channel. For example, the server circuitry may analyze the contextual information of electronic messages associated with channel members who are invited to the event (i.e. attendees), and determine whether these channel members describe a proposed time for the event in the electronic messages. In some embodiments, based on contextual information, the server circuitry may also calculate a likelihood of acceptance score on a proposed event time for each attendee. For example, the server circuitry may assign a high likelihood of acceptance score to a channel member on a proposed event time, based on determining that the channel member indicated he is likely available at the proposed event time in his electronic messages.

In some embodiments, when determining the location parameter, the server circuitry (such as the event generation request circuitry 210 of the event server 109 as shown in FIG. 2) may further analyze a workplace object associated with the group-based communication channel and/or the client devices, and generate the location parameter based at least in part on the workplace object. The workplace object is a data object that may comprise a workplace object metadata set. The workplace object metadata set may describe a variety of meeting places and their capacities ("location capacities"). For example, the workplace object metadata set may include data describing available meeting places (such as conference rooms in an office building) associated with channel members of the group-based communication channel. These data may further include information such as the maximum capacity for each meeting place, the conference equipment available for each meeting place, etc.

In some embodiments, the server circuitry may determine particular requirements of an event based on contextual information derived from analyzing the plurality of electronic messages. For example, the server circuitry may determine that a channel member works remotely from the office building associated with group-based communication channel, and thus an event with the channel member would require video or audio conference equipment so that the channel member can join the event. In this case, the server circuitry may determine a location parameter (indicating a meeting place for the event) based on information on conference equipment in different meeting places as described in the workplace object metadata set.

In some embodiments, BLUETOOTH® beacons may be used in connection with workplace data object to facilitate the determination of the location parameter by the server circuitry. BLUETOOTH® beacons are hardware transmitters that broadcast signals (such as their identifiers) to nearby client devices. In this case, each of the one or more BLUETOOTH® beacons may be associated with one of the meeting place within the office building. When a client device is in close proximity to a BLUETOOTH® beacon installed in a meeting place, the client device may transmit information related to the nearby meeting place to the server circuitry, and the server circuitry may determine the location parameter as the nearby meeting place.

In some embodiments, the server circuitry (such as the event generation request circuitry 210 of the event server 109 as shown in FIG. 2) may determine the attendee parameter associated with the event object metadata set based on the analysis of the electronic messages. For example, the server circuitry may determine that a channel member may be interested in a particular event based on the contextual information of electronic messages associated with the channel member, and may therefore add the user identifier of the channel member in the attendee parameter.

Further, the server circuitry (such as the event generation request circuitry 210 of the event server 109 as shown in FIG. 2) may identify other data objects (such as document objects) associated with the event object, and connect these data objects to the event object (for example, connecting documents objects that are related to the event to the event object). In some embodiments, based on the contextual information associated with the electronic messages, the server circuitry may identify a plurality of document objects associated with the event generation request, and connect the plurality of document objects to the event object.

For example, when the event is related to a product release, the server circuitry may analyze contextual information associated electronic messages in the group-based communication channel to determine documents that may be relevant to the product release. The product release in this example refers to the process of launching a new product for a market. Relevant documents may include, for example, product specifications. Such documents may be associated with the group-based communication channel and stored in a database, such as the one or more storages 117A-117N as described above in connection to FIG. 1.

Referring back to block 509 of FIG. 5, after one or more parameters of the event object metadata set are determined, the server circuitry (such as the event server 109 as shown in FIG. 2) may transmit the event generation request to a third-party calendar service (such as one or more third-party calendar service servers 111A-111N).

At block 511, the server circuitry (such as the event server 109 as shown in FIG. 2) may receive an event object from a third-party calendar service (such as one or more third-party calendar service servers 111A-111N) in connection with the event generation request generated ant transmitted at block 509.

At block 513, the server circuitry (such as the event generation request circuitry 210 of the event server 109 as shown in FIG. 2) may transmit the event object renderable for display within an interface associated with the group-based communication channel identifier. For example, the user interface circuitry of the input/output circuitry 206 of FIG. 2 may cause the rendering of the event object in an user interface associated with the group-based communication channel.

Additionally, or alternative, the server circuitry (such as the event generation request circuitry 210 of the event server 109 as shown in FIG. 2) may associate the event object with one or more other third-party calendar services (such as one or more third-party calendar service servers 111A-111N) in connection with the group-based communication platform (such as group-based communication platform 105). For example, the third-party calendar service may render and display the event object, and the group-based communication channel may generate electronic messages as reminders of the event, as described above. In this regard, the server circuitry (such as the event generation request circuitry 210 of the event server 109 as shown in FIG. 2) may communicate with one or more third-party calendar service servers (such as the one or more third-party calendar service servers 111A-111N described above in connection with FIG. 1) associated with channel members so that the event object is rendered and displayed on third-party calendar services.

The method 500 ends at block 515.

In some embodiments of the present disclosure, the server circuitry may generate an event generation prompt based on the contextual information associated with the plurality of electronic messages. The event generation prompt may suggest an event, and the server circuitry may transmit the event generation prompt to the client device so that the user can determine whether to request event generation. For example, based on the contextual information from the electronic messages in the group-based communication channel, the server circuitry may determine that the need for a product release conference has been discussed by the channel members, and may generate an event generation prompt (in the form of an electronic message) to the channel members to suggest creating an event for the product release call.

Sharing Event Object

As described above, various embodiments of the present disclosure overcome technical challenges associated with sharing an event to other users, including, for example, user authentication. Referring now to FIG. 6, an example method 600 for sharing an event object is disclosed.

The method 600 starts at block 602. At block 604, a server circuitry (such as the event generation request circuitry 210 of the event server 109 as shown in FIG. 2) may receive an event object sharing request from a first client device. Similar to the event generation request, the event object sharing request may be in the form of an electronic message to a group-based communication channel.

For example, a channel member, John, may want to share an event associated with the group-based communication channel with another channel member, Adam. John may input an electronic message to his client device, requesting the server circuitry to share the event object.

At block 606, a server circuitry (such as the event generation request circuitry 210 of the event server 109 as shown in FIG. 2) may generate an event object sharing link. The event object sharing link may be in the form of, for example, a uniform resource location (URL) that uniquely specify the web location of the event object in the group-based communication channel.

At block 608, a server circuitry (such as the event generation request circuitry 210 of the event server 109 as shown in FIG. 2) may transmit an electronic message comprising the event object sharing link to the first client device. Continuing from the above example, in response to John's request to share the event, the server circuitry may generate and transmit the event object sharing link for the event object in an electronic message to John's client device.

At block 610, a server circuitry (such as the event generation request circuitry 210 of the event server 109 as shown in FIG. 2) may receive an electronic selection on the event object sharing link from a second client device. The electronic selection may be, for example, a computer mouse click on the event object sharing link. Continuing from the above example, John may send the event object sharing link to Adam via an electronic message, and Adam may click, tap, or otherwise select the event object sharing link from his client device (i.e. a second client device).

At block 612, a server circuitry (such as the event generation request circuitry 210 of the event server 109 as shown in FIG. 2) may authenticate the second client device in response to receiving the electronic selection of the event object sharing link.

In some embodiments, authenticating the second client device may include identifying a user associated with the second client device. For example, based on an email address associated with the second client device, the server circuitry may determine the user identifier associated with the second client device. The server circuitry may then update the attendee parameter of the event object metadata set based on the user identifier.

Subsequent to authenticating the second client device, the server circuitry may further access one or more third-party calendar service servers associated with the second client device, so that a corresponding event is rendered and displayed through the third-party calendar services. For example, when generating the electronic message containing the event object sharing link, the server circuitry may also generate an "Add To Calendar" button associated with the event object sharing link in the same or a different electronic message to the first client device. When the first client device shares the electronic message with the second client device, the server circuitry may receive an electronic selection on the "Add To Calendar" button from the second client device. The server circuitry may communicate with one or more third-party calendar service servers (such as the one or more third-party calendar service servers 111A-111N described above in connection with FIG. 1), and cause the rendering of the event object on the third-party calendar services.

The method 600 ends at block 614.

Modifying Event Object and Coordinating Event

As described above, various embodiments of the present disclosure overcome technical challenges associated with event coordination, and further reduce office resource waste. Referring now to FIG. 7, an example method 700 for event coordination is described.

The method 700 starts at block 701. At block 703, a server circuitry (such as the event generation request circuitry 210 of the event server 109 as shown in FIG. 2) may retrieve an event object associated with a group-based communication platform. The event object may comprise an event object metadata set with a plurality of parameters for the event, as described above. For example, the event object may indicate a product release conference call at Conference Room A in the Office Building (i.e. the location parameter) scheduled at 2 p.m. on Jan. 2, 2019 (i.e. the time parameter) with attendees John and Adam (i.e. the attendee parameter).

At block 709, a server circuitry (such as the event generation request circuitry 210 of the event server 109 as shown in FIG. 2) may generate modification suggestions to one or more parameters in the event object metadata set associated with the event object. The modification suggestions indicate one or more changes to the parameters that would improve efficiency and reduce office resource waste. The modification suggestions may be generated based on, for example, information regarding the attendees, topics, location, etc.

For example, the server circuitry may analyze electronic messages associated with the group-based communication channel identifier at block 705, and perform natural language processing and determine contextual information at block 707, similar to block 505 and block 507 of FIG. 5 described above. In some embodiments, the server circuitry may analyze other information associated with the event object, such as but not limited to the workplace object, user profiles, as described above.

Continuing from the previous example, based on analyzing the event object, the contextual information, and other information associated with the event object, the server circuitry may further determine that the attendee John works remotely from the office building at the scheduled time for the conference. Such information may be determined based on, for example, location information associated with the attendee John as stored in the user profile. Based on analyzing the event object and the contextual information, the server circuitry may suggest a modification of the location parameter in the event object metadata set to indicate, for example, that the event may be a conference call only and likely does not need a physical conference room.

As another example, based on analyzing the attendee parameter of the event object metadata set of the event object, the server circuitry may determine that there are only two attendees of the event. Based on analyzing the event object and the workplace object, the server circuitry may determine that the scheduled location (e.g. Conference Room A) for the event has a capacity for ten people. Further, based on analyzing the time parameter of the event object metadata set and the workplace object, the server circuitry may determine that there is another location (e.g. Conference Room B) at the scheduled event time that can house two people and with a smaller capacity than ten. The server circuitry may suggest a modification of the location parameter to indicate Conference Room B, instead of Conference Room A.

As another example, based on analyzing the attendee parameter of the event object metadata set of an event object (e.g. Event A), the server circuitry may determine that one of the attendees may have another event (e.g. Event B) scheduled for the same or similar topic as Event A. Because of the similarities in the event topic, the server circuitry may suggest combining the two events to improve efficiency.

At block 711, the server circuitry (such as the event generation request circuitry 210 of the event server 109 as shown in FIG. 2) may identify an event coordinator associated with the event (for example, based on the owner/organizer parameter in the event object metadata set of the event object), and generate an electronic prompt to a client device associated with the event coordinator. The electronic prompt may be, for example, a push notification that is rendered and displayed on the client device associated with the coordinator. The push notification may indicate one or more suggestions to the parameters in the event object metadata set, which are generated at block 709, and may further request the user to input a response to the push notification (for example, "YES" to confirm changes to the parameters based on modification suggestions, or "NO" to reject changes).

At block 713, the server circuitry (such as the event generation request circuitry 210 of the event server 109 as shown in FIG. 2) may determine whether a confirmation is received from the client in response to the electronic prompt to the event coordinator. For example, in embodiments where the electronic prompt is a push notification, the server circuitry may receive an electronic input that indicates a confirmation to the push notification from the client device.

If a confirmation input is received, then, at block 715, the server circuitry (such as the event generation request circuitry 210 of the event server 109 as shown in FIG. 2) may modify one or more parameters in the event object metadata set based on modification suggestions generated at block 709. If no confirmation input is received, the method 700 ends at block 717.

As shown in the above description and examples, various embodiments of the present disclosure reduce office resource waste by programmatically suggesting and modifying parameters in the event object metadata set of an event object, based on analyzing information associated with the event object.

ADDITIONAL IMPLEMENTATION DETAILS

Although example processing systems have been described in FIGS. 1-2, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer-readable storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer-readable storage medium can be, or be included in, a computer-readable storage device, a computer-readable storage substrate, a random or serial access memory array or device, or a combination of one or more of them. Moreover, while a computer-readable storage medium is not a propagated signal, a computer-readable storage medium can be a source or destination of computer program instructions encoded in an artificially-generated propagated signal. The computer-readable storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (Application Specific Integrated Circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory, a random access memory, or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client device having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML (Hypertext Markup Language) page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as description of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results, unless described otherwise. In certain implementations, multitasking and parallel processing may be advantageous.

CONCLUSION

Many modifications and other embodiments of the disclosures set forth herein will come to mind to one skilled in the art to which these disclosures pertain having the benefit of the teachings presented in the foregoing description and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

The invention claimed is:

1. One or more non-transitory computer-readable media storing computer-executable instructions that, when executed by at least one processor, perform a method comprising:
    receiving, via a client device, an electronic message associated with a group of users in a user interface associated with a group-based communication platform;
    determining, using natural language processing, whether the electronic message includes a request by a first user to schedule an event with a second user;
    upon determining that the electronic message includes the request by the first user, generating an event generation request requesting creation of an event object representing a calendar event;
    transmitting the event generation request to the second user, the event generation request comprising a retrieval request for the event object and an event object metadata set, wherein the event object metadata set comprises at least a time parameter and an attendee parameter;
    receiving, from the second user, a user acceptance input associated with the event object; and
    causing display of an updated event object in the user interface to reflect the user acceptance input from the second user associated with the event object.

2. The media of claim 1, wherein the attendee parameter comprises a listing of users associated with the group-based communication platform who are associated with the calendar event.

3. The media of claim 2, wherein the time parameter comprises information about a date, a starting time, and an ending time of the calendar event.

4. The media of claim 3, further comprising:
    determining, based on an analysis of an availability of users included in the attendee parameter, the date, the starting time, and the ending time of the time parameter.

5. The media of claim 4, wherein the event object metadata set further comprises a location parameter having location information associated with a plurality of locations and capabilities of each location of the plurality of locations.

6. The media of claim 5, further comprising:
determining, based on a further analysis of the electronic message, the time parameter, and the attendee parameter, a location for hosting the calendar event.

7. The media of claim 6, wherein the location for hosting the calendar event is a group-based communication channel associated with the group-based communication platform.

8. A method comprising:
receiving, via a client device, an electronic message associated with a group of users in a user interface associated with a group-based communication platform;
determining, using natural language processing, whether the electronic message includes a request by a first user to schedule an event with a second user;
upon determining that the electronic message includes the request by the first user, generating an event generation request requesting creation of an event object representing a calendar event;
transmitting the event generation request to the second user, the event generation request comprising a retrieval request for the event object and an event object metadata set, wherein the event object metadata set comprises at least a time parameter and an attendee parameter;
receive, from the second user, a user acceptance input associated with the event object; and
causing display of an updated event object in the user interface to reflect the user acceptance input from the second user associated with the event object.

9. The method of claim 8, wherein the attendee parameter comprises a listing of users associated with the group-based communication platform who are associated with the calendar event.

10. The method of claim 9, wherein the time parameter comprises information about a date, a starting time, and an ending time of the calendar event.

11. The method of claim 10, further comprising:
determining, based on an analysis of an availability of users included in the attendee parameter, the date, the starting time, and the ending time of the time parameter.

12. The method of claim 11, wherein the event object metadata set further comprises a location parameter having location information associated with a plurality of locations and capabilities of each location of the plurality of locations.

13. The method of claim 12, further comprising:
determining, based on a further analysis of the electronic message, the time parameter, and the attendee parameter, a location for hosting the calendar event.

14. The method of claim 13, wherein the location for hosting the calendar event is a group-based communication channel associated with the group-based communication platform.

15. A system for generating an event data object for display in a group-based communication platform, the system comprising:
a data store;
a processor; and
one or more non-transitory computer-readable media storing computer-executable instructions that, when executed by the processor, perform a method for generating an event data object for displaying in the group-based communication platform, comprising:
receiving, via a client device, an electronic message associated with a group of users in a user interface associated with the group-based communication platform;
determining, using natural language processing, whether the electronic message includes a request by a first user to schedule an event with a second user;
upon determining that the electronic message includes the request by the first user, generating an event generation request requesting creation of an event object representing a calendar event;
transmitting the event generation request to the second user, the event generation request comprising a retrieval request for the event object and an event object metadata set, wherein the event object metadata set comprises at least a time parameter and an attendee parameter;
receiving, from the second user, a user acceptance input associated with the event object; and
causing display of an updated event object in the user interface to reflect the user acceptance input from the second user associated with the event object.

16. The system of claim 15, wherein the attendee parameter comprises a listing of users associated with the group-based communication platform who are associated with the calendar event.

17. The system of claim 16, wherein the time parameter comprises information about a date, a starting time, and an ending time of the calendar event.

18. The system of claim 17, further comprising:
determining, based on an analysis of an availability of users included in the attendee parameter, the date, the starting time, and the ending time of the time parameter.

19. The system of claim 18, wherein the event object metadata set further comprises a location parameter having location information associated with a plurality of locations and capabilities of each location of the plurality of locations.

20. The system of claim 19, further comprising:
determining, based on a further analysis of the electronic message, the time parameter, and the attendee parameter, a location for hosting the calendar event.

* * * * *